United States Patent
Bulusu et al.

(10) Patent No.: US 8,356,143 B1
(45) Date of Patent: Jan. 15, 2013

(54) PREFETCH MECHANISM FOR BUS MASTER MEMORY ACCESS

(75) Inventors: Ravi P. Bulusu, Andhra Pradesh (IN); Subir K. Ghosh, San Jose, CA (US)

(73) Assignee: NVIDIA Corporatin, Santa Clara, CA (US)

( * ) Notice: Subject to any disclaimer, the term of this patent is extended or adjusted under 35 U.S.C. 154(b) by 206 days.

(21) Appl. No.: 10/971,608

(22) Filed: Oct. 22, 2004

(51) Int. Cl.
*G06F 12/00* (2006.01)

(52) U.S. Cl. .................... 711/137; 711/108; 713/323

(58) Field of Classification Search .............. 711/137, 711/154, 167; 713/323
See application file for complete search history.

(56) References Cited

U.S. PATENT DOCUMENTS

| | | | |
|---|---|---|---|
| 5,455,913 A | 10/1995 | Shrock et al. | |
| 5,546,548 A | 8/1996 | Chen et al. | |
| 5,649,230 A | 7/1997 | Lentz | |
| 5,717,954 A | 2/1998 | Grieff et al. | |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | 395/280 |
| 5,923,859 A | 7/1999 | Melo et al. | |
| 5,940,866 A | 8/1999 | Chisholm et al. | |
| 5,968,143 A | 10/1999 | Chisholm et al. | |
| 6,016,528 A | 1/2000 | Jaramillo et al. | |
| 6,018,803 A * | 1/2000 | Kardach | 713/323 |
| 6,029,223 A | 2/2000 | Klein | |
| 6,029,228 A | 2/2000 | Cai et al. | |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 | 2/2001 | Wilcox | |
| 6,205,524 B1 | 3/2001 | Ng | |
| 6,226,695 B1 | 5/2001 | Kaiser et al. | |
| 6,233,656 B1 | 5/2001 | Jones et al. | 711/137 |
| 6,266,742 B1 | 7/2001 | Challenger et al. | |
| 6,298,407 B1 | 10/2001 | Davis et al. | |

(Continued)

OTHER PUBLICATIONS

Jason Fritts, "Multi-Level Memory Prefetching for Media and Stream Processing", Proceedings, 2002 IEEE International Conference on Multimedia and Expo, 2002. ICME '02. vol. 2, Aug. 26-29, 2002 pp. 101-104 vol. 2.

(Continued)

*Primary Examiner* — Yong Choe (57) ABSTRACT

A system and method for optimizing memory bus bandwidth, is achieved by utilization of the memory bus, either by utilizing the idle time of the memory bus, or by prioritizing prefetch requests to exploit the bank structure of the external memory. When a bus master of the memory bus makes a request to access a particular line in a memory device, the memory controller generates a request for accessing a line next to the current line that is requested by the bus master. Data corresponding to the next line is retrieved from the memory device and stored in the memory-controller when the memory bus is idle. The stored data may be served to a bus master upon request for the data. However, the memory bus is not engaged when the data stored in the memory controller is served. Therefore idle time of the memory bus is utilized.

26 Claims, 8 Drawing Sheets

U.S. PATENT DOCUMENTS

| | | | |
|---|---|---|---|
| 6,314,472 B1 | 11/2001 | Trieu et al. | |
| 6,345,341 B1 | 2/2002 | Arimilli et al. | |
| 6,397,296 B1 | 5/2002 | Werner | |
| 6,418,496 B2 | 7/2002 | Pawlowski et al. | |
| 6,442,634 B2 | 8/2002 | Bronson et al. | |
| 6,480,939 B2 | 11/2002 | Anderson et al. | |
| 6,526,518 B1 | 2/2003 | Catlin et al. | |
| 6,560,657 B1 | 5/2003 | Gandhi et al. | |
| 6,571,318 B1 | 5/2003 | Sander et al. | |
| 6,574,712 B1 | 6/2003 | Kahle et al. | |
| 6,578,102 B1 | 6/2003 | Batchelor et al. | |
| 6,631,434 B1 | 10/2003 | Johnson et al. | |
| 6,681,281 B1 | 1/2004 | Maleck | |
| 6,681,285 B1 | 1/2004 | Ng | |
| 6,696,854 B2 | 2/2004 | Momtaz et al. | |
| 6,696,954 B2 | 2/2004 | Chung | |
| 6,745,258 B1 | 6/2004 | Pellegrino et al. | |
| 6,751,038 B1 | 6/2004 | Wada | |
| 6,754,755 B1 | 6/2004 | Johnson et al. | |
| 6,782,457 B2 | 8/2004 | Hill et al. | |
| 6,801,963 B2 | 10/2004 | Smith et al. | |
| 6,842,803 B2 | 1/2005 | Schmidt et al. | |
| 6,877,048 B2 | 4/2005 | Bilak et al. | |
| 6,898,649 B2 | 5/2005 | Goudie | |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,910,106 B2 | 6/2005 | Sechrest et al. | |
| 6,915,363 B2 | 7/2005 | Wood et al. | |
| 6,950,892 B2 | 9/2005 | Bell, Jr. et al. | |
| 6,957,290 B1 | 10/2005 | Rowlands et al. | |
| 6,996,684 B2 | 2/2006 | Tseng et al. | |
| 6,999,426 B2 | 2/2006 | Miyoshi | |
| 7,032,046 B2 | 4/2006 | Horii et al. | |
| 7,096,291 B2 | 8/2006 | Lin | |
| 7,124,232 B2 | 10/2006 | Takeda et al. | |
| 7,139,878 B2 * | 11/2006 | Malik et al. | 711/137 |
| 7,143,219 B1 | 11/2006 | Chaudhari et al. | |
| 7,177,985 B1 * | 2/2007 | Diefendorff | 711/137 |
| 7,263,566 B2 | 8/2007 | Ganasan et al. | |
| 7,376,846 B2 | 5/2008 | Hawkins et al. | |
| 7,389,466 B1 | 6/2008 | Harmer et al. | |
| 7,505,461 B2 | 3/2009 | Matsuda et al. | |
| 7,525,986 B2 | 4/2009 | Lee et al. | |
| 7,600,058 B1 | 10/2009 | Danilak | |
| 7,706,756 B2 | 4/2010 | Sato et al. | |
| 7,895,385 B2 | 2/2011 | Raju | |
| 2001/0001873 A1 | 5/2001 | Wickeraad et al. | |
| 2001/0014928 A1 | 8/2001 | Chrysos et al. | |
| 2002/0023204 A1 | 2/2002 | Barowski et al. | |
| 2002/0056027 A1 | 5/2002 | Kanai et al. | |
| 2002/0144054 A1 * | 10/2002 | Fanning et al. | 711/108 |
| 2003/0191880 A1 | 10/2003 | Lin | |
| 2003/0229743 A1 | 12/2003 | Brown | |
| 2003/0229762 A1 | 12/2003 | Maiyuran et al. | |
| 2004/0024947 A1 | 2/2004 | Barth et al. | |
| 2004/0024948 A1 | 2/2004 | Winkler et al. | |
| 2004/0049641 A1 * | 3/2004 | So et al. | 711/137 |
| 2004/0064649 A1 | 4/2004 | Volpe et al. | |
| 2004/0083341 A1 | 4/2004 | Robinson et al. | |
| 2004/0088458 A1 | 5/2004 | Tomlinson et al. | |
| 2004/0117606 A1 | 6/2004 | Wang et al. | |
| 2004/0123043 A1 | 6/2004 | Rotithor et al. | |
| 2004/0201647 A1 | 10/2004 | Jackson Pulver et al. | |
| 2005/0081014 A1 | 4/2005 | Tran et al. | |
| 2005/0138254 A1 | 6/2005 | Raghavan et al. | |
| 2005/0216607 A1 | 9/2005 | Munguia | |
| 2006/0041721 A1 | 2/2006 | Hakura et al. | |
| 2006/0041722 A1 | 2/2006 | Hakura et al. | |
| 2006/0041723 A1 | 2/2006 | Hakura et al. | |
| 2006/0095677 A1 | 5/2006 | Hakura et al. | |
| 2007/0198758 A1 | 8/2007 | Asano et al. | |
| 2009/0055566 A1 | 2/2009 | Reinig et al. | |
| 2009/0089477 A1 | 4/2009 | Reed | |
| 2009/0228631 A1 | 9/2009 | Marulkar et al. | |
| 2010/0057973 A1 | 3/2010 | Barake et al. | |

OTHER PUBLICATIONS

John Carter, et al., "Impulse: Building a Smarter Memory Controller". Proceedings, Fifth International Symposium on High-Performance Computer Architecture. Jan. 9-13, 1999 pp. 70-79.

"Using Spin-Loops on Intel Pentium 4 Processor and Intel Xeon Processor". Version 2.1, May 2001. Order No. 248674-002. Retrieved from http://cache-www.intel.com/cd/00/00/01/76/17689_w_spinlock.pdf on Mar. 4, 2006.

Jouppi, N. P. "Improving direct-mapped cache performance by the addition of a small fully-associative cache and prefetch buffers", Proceedings. 17th Annual International Symposium on Computer Architecture, 1990. 28-31 May 1990 pp. 364-373.

"Battery Charging Specification", USB Implementation Forum, Inc., Dated: Mar. 8, 2007, pp. 1-29, Revision 1.0.

"Device Class Specification Adopters Agreement", Downloaded Circa: Mar. 10, 2007, pp. 1-5.

Brandt, Scott, "Module 2: Computer-System Structure" Spring 2001, http://www/spe/icsc/edi/-sbrandt/courses/Spring01/111/slides/mod2.1.pdf.

Non-Final Office Action, Dated Mar. 21, 2006; U.S. Appl. No. 10/674,618.

Non-Final Office Action, Dated Oct. 18, 2006; U.S. Appl. No. 10/674,618.

* cited by examiner

PREFETCH MECHANISM FOR BUS MASTER MEMORY ACCESS

BACKGROUND OF THE INVENTION

1. Field of the Invention

The present invention relates generally to computer systems and more particularly to bandwidth utilization of a memory bus in a computer system wherein a bus master prefetch unit responds to a bus master request for accessing a first line of data by fetching a second adjacent line of data and storing it in a prefetch buffer for later access subsequent to accessing the first line.

2. Description of the Prior Art

In today's information based society, computer systems are widely used, for example in enterprises, homes, universities, manufacturing units, government organizations and research centers. Modern day computers need to perform several tasks simultaneously. These tasks may include execution of large and sophisticated applications that benefit from faster computer systems with higher processing speed.

The overall processing speed of a computer system depends on the speed of its various components. Today's computers employ high-speed processing units. However, each component of a computer system can limit the overall speed of the system. One such component that limits the processing speed of a computer system is the memory bus that connects a memory device, for example an external DRAM, to the other components of the computer system.

The memory bus may have many masters which may be controllers, for accessing the memory device through the memory bus. Several applications can access the memory device through the bus masters. Bus masters include various internal hardware components such as processors, Direct Memory Access (DMA) controllers and so forth. All the masters of the memory bus are connected to the memory bus through a memory controller. The memory controller arbitrates over the bus masters for access to the memory device by prioritizing requests from various bus masters according to predefined rules.

Requests for access to the memory device are queued in the memory controller. The memory controller allows the masters to access the memory device one by one. Each request has to wait for its turn to gain access to the memory device. This limits the overall speed of processing. Further, there are times when there is no request in queue. In such times, the memory bus remains idle.

High bandwidth devices are very common in today's applications for most computer peripherals and consumer electronic devices. High bandwidth devices include masters like the USB and the display driver. These devices have specific bandwidth and data rate requirements for efficient performance and functionality of the device. Lack of bandwidth in accessing the memory device hurts the actual system performance.

Several attempts have been made to utilize this idle time of the memory bus to optimize the bandwidth usage of the memory bus. In order to increase the overall speed of bus master accesses to the memory device, the concept of prefetching of data is employed. Prefetching of data means getting data from slow external memory devices ahead of time. This is done so that a resource requesting data will not have to wait for the data to be fed from the memory device when it is actually needed. This reduces the overall latency of reading data from the external memory.

Several patents exist that deal with optimization of the memory bus bandwidth. One such patent is U.S. Pat. No. 5,881,248, titled "System and Method for Optimizing System Bus Bandwidth in an Embedded Communication System" assigned to Advanced Micro Devices, Inc. This patent relates to a communication system that includes a receive buffer, a memory, a CPU, a direct memory access (DMA) controller and a bus arbitrator. Each of these components is coupled to the memory bus. The buffer operates to generate a low or high priority DMA transfer request. When the buffer generates a low priority DMA request, the DMA controller and/or bus determine if the system bus is otherwise not being utilized. If the system bus if not being utilized, the DMA transfer is allowed. Thus, the system utilizes the idle time of the memory bus.

Another patent that deals with the optimization of memory bus bandwidth is U.S. Pat. No. 6,233,656, titled "Bandwidth Optimization Cache", assigned to LSI Logic Corporation. The patent relates to optimizing bus bandwidth utilization in an environment where bus accesses range in size from a single word to multi-word burst accesses. The system achieves this by prefetching and caching additional words when responding to a single word access request. Prefetching of data means retrieving and storing data even if there is no request for the data. This data may be served to a requester if it requests the data at a future later time. The invention includes receiving a read request from a client, checking the contents of a cache to determine whether the cache contains the information sought in the read request and returning the information from the cache if a cache hit results. If the data is not in the cache, a bus transaction is initiated by fetching a block of memory containing the information from a memory store, sending the information to the client, and caching the additional remaining information included with the fetched block of memory. The system disclosed in the above mentioned patent includes a cache memory, which stores a chunk of data that includes the requested data. This cache based prefetch mechanism concentrates on speeding up data access for the requester that the Cache services. Cache based mechanisms, however, do not optimize the external memory bus bandwidth utilization.

Another disclosure that deals with the optimization of memory bus bandwidth is US Patent Application Number 20030126355, entitled "Distributed Memory Module Cache Prefetch". The disclosure relates to a distributed memory module cache including a tag memory and associated logic implemented at the memory controller end of a memory channel. The memory controller is coupled to a memory module. The data cache and associated logic are located in one or more buffer components in each of the memory modules. The disclosed system has the ability to read a current line of data out of a memory module DRAM and to load the next cache line of data into the memory module data cache. This allows the utilization of excess DRAM interconnect bandwidth, while preserving limited memory bus bandwidth.

However, the existing systems do not effectively optimize the memory bus bandwidth for bus master accesses using the concept of prefetching. Further, external memory devices such as SDRAM and DDR SDRAM organize data in a set of two or more banks. Each bank again is organized into a set of rows and columns. Every time a data is read from this memory, the particular row of the bank, which has this data, is "opened" for reading. This bank is then "closed" by the memory when the data in the memory is "refreshed" or when data is read from a different row of the same bank. An overhead in terms of power consumption and time is incurred whenever a bank has to be opened or closed in the memory. The existing systems do not utilize the bank structure of memory devices to speed up bus master accesses to the memory device.

In light of the preceding discussion, there exists a need for an efficient and cost effective memory bus bandwidth optimization system for bus master accesses. There is a requirement for a system and method that can intelligently fetch data that is likely to be used by the system in the future from the memory device. There is also a need for a system that has lower power consumption. Furthermore, there is a need for a system and method that utilizes the memory bus bandwidth in an intelligent and calculated fashion.

SUMMARY

An object of the present invention is to provide a system and method for optimizing memory bus bandwidth and enhancing the speed of retrieving data requested by bus masters from a memory device.

Another object of the method and system of the present invention is to intelligently predict future requests for data that is likely to be used by one of the memory bus masters.

Another object of the method and system of the present invention is to feed the data back to the bus masters at a much faster rate compared to retrieving data directly from the memory device.

Yet another object of the present invention is to provide a programmable feature, wherein one or more bus masters may be enabled for prefetching.

A still further object of the present invention is to provide a programmable feature, wherein a definite set of addresses in the memory can be enabled for prefetching.

A further object of the method and system of the present invention is to perform prefetch in a way such that it does not interfere with the actual requests from bus masters.

Another object of the present invention is to utilize the bank structure of an external memory device in the most efficient form so as to minimize latency of accesses for data to external memory. This is done by immediately serving the prefetch request after the actual request from the bus master has been sent to the external memory. The prefetched address in the present invention is the next sequential address in the memory, and therefore the likelihood of this address being in an open row is very high. This reduces the number of times the memory bank has to be opened or closed, and therefore the effective latency at which data is fed to the requester is reduced. Moreover, reduction of the number of transitions the external control signals to the memory have to so through reduces the power consumption of the entire system.

Furthermore, an object of the system of the present invention is to provide a cost effective system for efficient utilization of memory bus bandwidth.

Another object of the present invention is to equip the prefetch unit with a prefetch abort controller, which minimizes any redundant requests for data that would otherwise be performed by the prefetch unit after the last request from the bus master.

Briefly, a preferred embodiment of the present invention is directed to a method and system for the optimization of memory bus bandwidth by the utilization of memory bus idle time. The system comprises a memory device, a plurality of bus masters, a memory bus and a memory controller. The bus masters access the memory device through the memory bus. The bus masters are connected to the memory bus through the memory controller. The memory controller allows the bus masters to access the memory device one by one. The memory controller may have many requesters/masters accessing the external memory apart from just the bus masters.

The memory controller also includes an arbitration unit and a bus master prefetch unit. The arbitration unit receives requests for accessing the memory device from various bus masters, and prioritizes these requests according to a predefined set of rules.

The bus master prefetch unit determines if a requesting bus master is enabled for prefetching, or if the request is directed for data that is stored in a prefetch enabled chunk of data in the memory device. Prefetching of data means retrieving and storing data for future use even if there is no request for the data. Further, when a prefetch enabled bus master makes a request for accessing a particular line in the memory device, the bus master prefetch unit aborts a previous prefetch request and generates a new request for accessing the next in address line in the memory device. This request is queued in the arbitration unit along with other requests from bus masters/requesters. The prefetch request could be serviced either immediately after the actual request, or, alternatively could be serviced when the memory bus is idle, i.e., when there are no other requests to be served through the memory bus. Either of the above options can be chosen by the firmware based on its requirement. For the prefetch request being served, data from the memory device is retrieved and stored in a prefetch buffer in the bus master prefetch unit. When a bus master makes a request for data stored in the prefetch buffer, this data is served to the bus master without engaging the memory bus. In this manner, idle time of the memory bus is utilized for fetching data in advance.

The prefetch mechanism as described above has several advantages over prior art cache mechanisms for bus bandwidth optimization. In the method and system of the present invention, the prefetch mechanism predicts data which is likely to be used in the future. Requests for predicted data are made in sequentially increasing or decreasing order of addresses. The sequential order of the addresses being fetched is a derivative of the natural property of the bus masters to fetch and store a huge chunk of data in contiguous locations in memory. In the prior art cache mechanism, however, the fetched data is 'wrapped around' the actually requested address. 'Wrapped around' data includes addresses both before and after the address of the actually requested address. This wrapped around data is not necessarily in sequentially increasing or decreasing order.

Furthermore, in the case of the prefetch mechanism of the present invention, the prefetch controller and the prefetch buffer may be embedded in the memory controller. This configuration of the prefetch unit being embedded in the memory controller helps the prefetch controller work in a tightly coupled fashion with the memory controller. This helps the prefetch controller and the memory controller work together to utilize the external memory bus efficiently whenever the bus is idle. Hence, the memory bus bandwidth is better utilized. The Cache based prefetch mechanism of the prior art, however, only tries to optimize the speed of processor accesses.

In an embodiment of the present invention, the bus master prefetch unit includes an idle timer, which measures the time that the memory bus remains idle. A prefetch request is served only if the idle timer indicates that the memory bus has been idle for more than a programmable threshold time.

In another embodiment of the present invention, the prefetch buffer in the bus master prefetch unit has multiple lines of buffer for storing data. In this embodiment, the system is capable of prefetching multiple lines of data from addresses, which are sequentially addressed after accessing the address that is requested by the bus master.

The system of the present invention also includes a prefetch abort controller, that is capable of identifying whether a request is the last request from a requesting bus master. If the request is identified as the last request, a prefetch request that was generated due to a previous request from the bus master is aborted. In this manner, the system provides an efficient method for utilization of memory bus bandwidth.

BRIEF DESCRIPTION OF THE DRAWINGS

The preferred embodiments of the present invention will hereinafter be described in conjunction with the appended drawings provided to illustrate and not to limit the invention, wherein like designations denote like elements, and in which.

DETAILED DESCRIPTION OF THE PREFERRED EMBODIMENT

Terminology used:

Bus: A Bus is a transmission line or path in a computer system. This path is usually in the form of electrical wires, metallic connections or other transmission media.

Memory bus: The bus that connects a memory device to other parts of the computer system is called a memory bus. Signals may be dropped off or picked up at every point that is connected to the path.

Memory bus bandwidth: Memory bus bandwidth refers to the capacity of the memory bus to carry information. Memory bus bandwidth can be measured in terms of the amount of information that can be carried through the memory bus in given period of time.

Idle time of memory bus: Idle time of the memory bus is the time that the memory bus is not in use, i.e., the time when the memory bus is not carrying any information.

Prefetching: The concept of retrieving and storing data, even when there is no external request for the data, is called prefetching. This data may be served to a requester upon request for the data at a later time.

Bus master: Bus master is a hardware or software component that uses the bus for receiving or sending information. In the context of the present disclosure, bus masters use the memory bus for accessing the memory device.

Arbitration: Arbitration refers to prioritizing various requests that are received by a controller. In the context of the present disclosure, arbitration refers to deciding the sequence in which various requests for accessing the memory device from bus masters are served.

Buffer: A buffer is a memory device with limited capacity that stores data.

The present invention provides a system and method for optimizing memory bus bandwidth and enhancing the speed of retrieving data requested by bus masters from a memory device. Optimization of memory bus bandwidth is achieved by utilization of idle time of the memory bus. The idle time is utilized for prefetching data from the external memory that is predicted to be used in the future.

Figure 1:
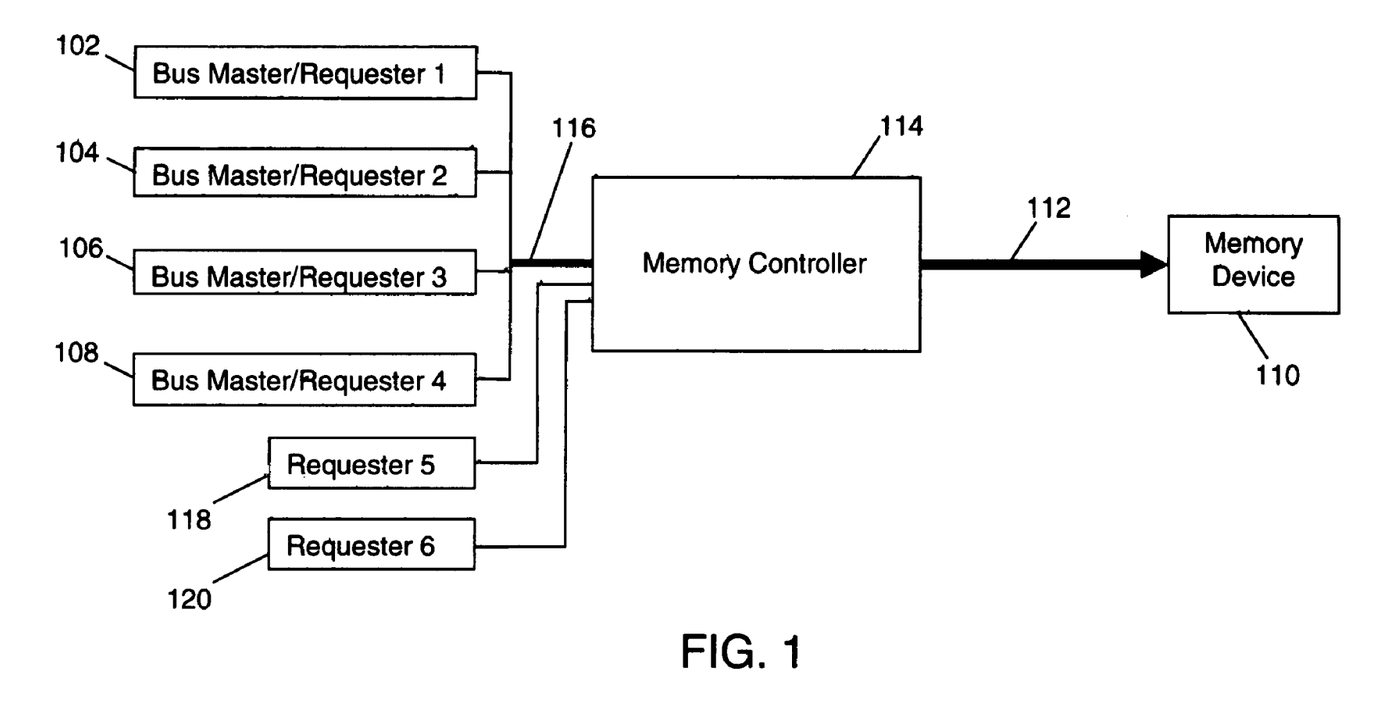
FIG. 1 is a block diagram showing an operational environment for the present invention.

FIG. 1 is a block diagram showing an illustrative operational environment for the present invention. One or more bus masters require information from the memory device 110. Four such bus masters 102, 104, 106, and 108 are shown in FIG. 1. Although four bus masters have been depicted in FIG. 1, it will be apparent to one skilled in the art that there can be any number of masters requesting access to the memory device. Bus masters 102, 104, 106, and 108 are connected to a memory controller 114 through a bus 116. Memory controller 114 routes requests from various AHB bus masters and other requesters to memory device 110, and performs the processes according to the present invention that will be explained in detail in the following text of the specification. For example, requester 118 and 120 are connected to memory controller 114 as shown in the figure. Requesters 118 and 120 may be, for example, a processing unit that needs to access the memory device 110. Bus 116 may be, for example, an Advanced High-performance Bus (AHB)™ and bus masters 102, 104, 106 and 108 may be a display driver, an audio playback driver or other such bus masters. Memory device 110 may be, for example, SRAM, SDRAM, PBSRAM and so forth. External memories like SDRAM & DDR SDRAM are commonly used memory devices in most of the computer peripherals and myriads of consumer electronic devices. This is because of their low cost and very high densities. These memories organize data in a set of two or more banks. Each bank again is organized into a set of rows and columns. Every time a particular data is read from this memory, the particular row of the bank which has the data is 'opened' for reading. This bank is closed again later by the memory when the data in the memory is 'refreshed' or when data is read from a different row of the same bank. An overhead in terms of time is incurred whenever a bank has to be opened or closed in the memory. It can therefore be easily understood that the fastest way of reading data from memory is to sequentially access all data from the same row. This kind of access provides the most optimal performance for read accesses from external memory.

Data in such memory devices are stored in the from of data words or half words. Each data word/half word is a chunk of data whose size can be 4 bytes, 8 bytes, and so forth. A set of 4, 8 or more data words is referred to as a line of data. A data line is the maximum size of data that can be fetched by the memory-controller in one burst.

Each byte/half word/word has an address associated with it. For example, a bytewide memory (i.e., a memory whose width is 8 bits/1 byte) would have an address for every byte. Similarly a half word-wide memory would have an address for every half word. In the case of a data line, the address of the first word in the data line is considered to be the address of the data line. The address of the first word in the data line is hereinafter referred to as the address of the data line.

The requests from bus masters 102, 104, 106, and 108, and requesters 118 and 120 are called bus master requests. These bus masters could be Direct Memory Access (DMA) controllers. The bus masters usually request data sequentially due to the inherent nature of the devices they service. This concept of sequential requests from bus masters has been explained using a couple of examples in the background section. These requests are directed to a chunk of data including several lines. These lines have sequential addresses. These requests are muted through a memory bus 112.

Bus masters 102, 104, 106, and 108 request memory controller 114 for accessing memory device 110. The bus masters request one particular line in the memory device at a time. These requests are queued in memory controller 114. Memory controller 114 arbitrates over these requests. Only one request is served at a time because with only a single memory bus, the memory controller can service only one request at a time. Memory controller 114 therefore prioritizes the requests from bus masters 102, 104, 106, and 108 and allows bus masters 102, 104, 106, and 108 to access memory device 110 one by one. Memory controller 114 prioritizes the request according to certain predefined rules. These rules may include, among other factors, associating different priorities to different requests depending on the particular requesting bus master, and the amount of data requested.

When a request for accessing the memory device 110 is served, data is transferred though memory bus 112 as bursts of data. Every computer system supports a predefined maximum burst transfer size. This maximum burst transfer size may be of one, two or more lines of data. Bus masters 102, 104, 106, and 108 may make a request for data less than one data line. Memory controller 114 may be implemented in the form of a hardware device or a programmable firmware device.

Figure 2:
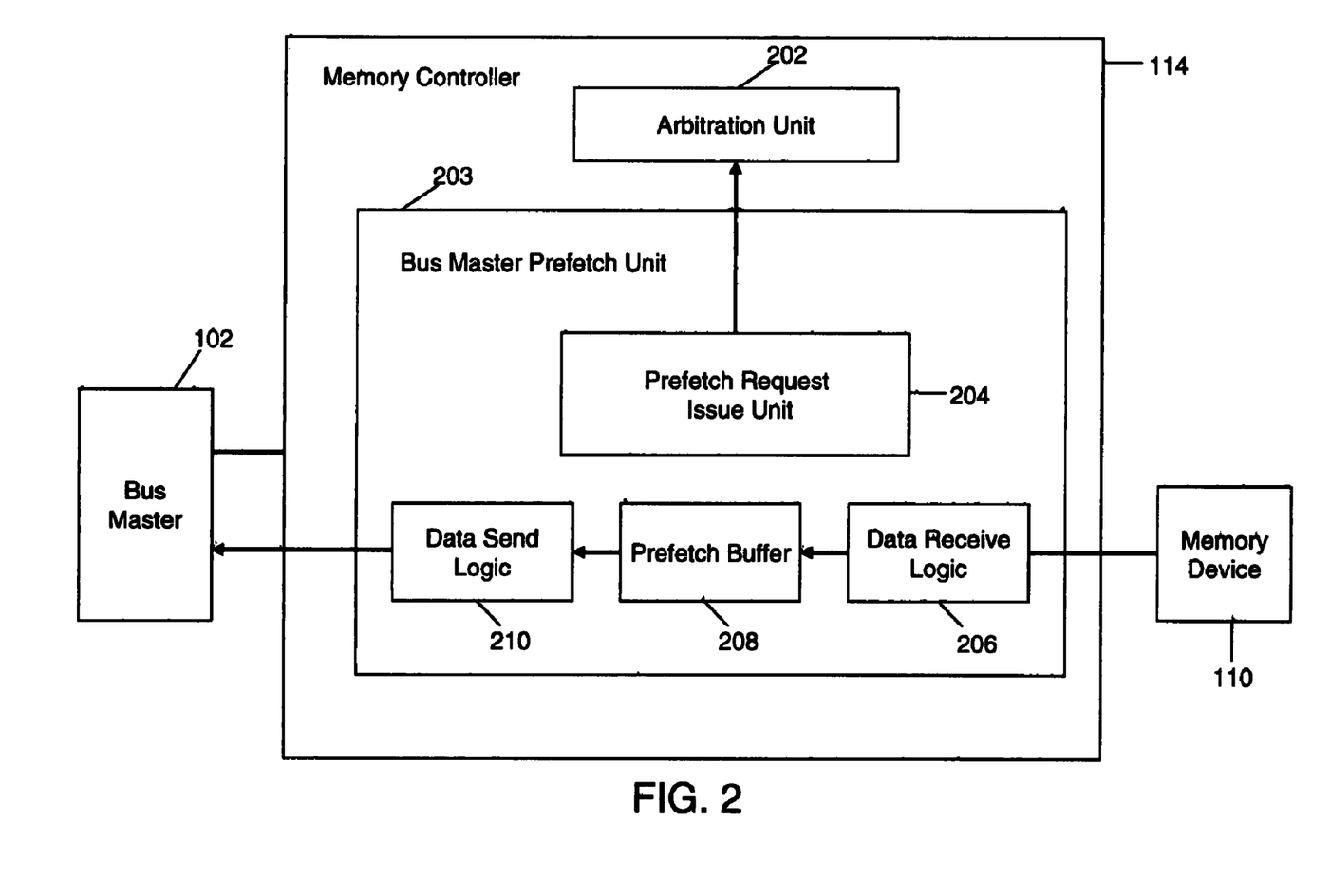
FIG. 2 is a block diagram of a memory controller in accordance with a preferred embodiment of the present invention.

FIG. 2 is a block diagram of the memory controller 114 in accordance with a preferred embodiment of the present invention. Memory controller 114 includes an arbitration unit 202 and a bus master prefetch unit 203. FIG. 2 shows the prefetch unit 203, integrally included within the memory controller 114. The necessary interconnections between the prefetch unit 203 and the memory controller will be understood by those skilled in the art and are not shown in detail. The prefetch unit 203 can alternatively be a separate unit from the memory controller 114 with the required interconnections, which will be understood by that skilled in the art. Arbitration unit 202 arbitrates over the requests made by the bus masters 102, 104, 106, and 108 for accessing the memory device 110. Bus master prefetch unit 203 includes a prefetch request issue unit 204, a prefetch data receive logic 206, a prefetch buffer 208, and a data send logic 210. Bus master prefetch unit 203 may be a hardware device of a programmable firmware device within memory controller 114. Bus master prefetch unit 203 has various programmable features, which will be discussed in detail in the following text of the present disclosure.

Though FIG. 2 shows the bus master prefetch unit 203 incorporated within memory controller 114, the bus master prefetch unit 203 may exist as a separate hardware device, which may be coupled to memory controller 114 by means of electrical connections.

Prefetch request issue unit 204 is capable of generating requests for accessing the memory device 110. Prefetch data receive unit 206 is capable of receiving data from the memory device 110 and sending it to the prefetch buffer 208. Prefetch buffer 208 may be of a size equal to the maximum burst transfer size that is supported by the system on which it is employed. In one embodiment of the present invention, the prefetch buffer 208 is capable of storing multiple lines of data. Data send logic 210 is capable of sending data stored in prefetch buffer 208 to a requesting bus master.

When bus master 102 requests memory controller 114 for accessing a particular line of data in the memory device 110, the prefetch request issue unit 204 generates a request for accessing the next in address line of data in the memory device 110. This request is queued in the arbitration unit 202.

The prefetch request can be queued in two ways. In the first case, the prefetch request is served immediately after a request from bus master 102 is served. Serving of the prefetch request immediately after the actual request from bus master 102 speeds up the data retrieval from memory for the prefetch request. This is because the actual request preceding the prefetch request keeps the required row of the external memory open. The prefetch request now has to just read the data from the open row and hence does not have to incur the overhead of opening a row. On the other hand, if the address of the prefetch request data is separated from the address of the actual request data, the overhead for closing and opening of rows is incurred. In the second case, when there are no requests from bus masters to be served, arbitration unit 202 allows bus master prefetch unit 203 to access memory device 110. Data receive logic 206 receives data corresponding to the next in address line of data in memory device 110. The received data is stored in prefetch buffer 208. When bus master 102 requests some data, bus master prefetch unit 203 checks if the data is stored in prefetch buffer 208. If the data is found in prefetch buffer 208, data send logic 210 extracts the data from prefetch buffer 208 and sends it to bus master 102.

Consider for example a case where the bus master 102 is a high bandwidth display driver that accesses the memory device 110 through memory bus 112. Bus master 102 needs to access certain data in the memory device 110, and this data may include several lines of data stored in the memory device 110. Suppose bus master 102 sends a request for line L1 in the memory device 110. Since data is requested sequentially by the bus master corresponding to the display driver, it is likely that bus master 102 will also require line L2 at a later moment, which is the next in address line of data to line L1 in memory device 110. On receiving a request for L1, prefetch request issue unit 204 generates a request for accessing line L2. After this request for L1 is served, the prefetch receive logic 206 fetches data from line L2 and stores it in the prefetch buffer 208. When or if the bus master 102 requests line L2, data send logic 210 sends the L2 data that is stored in prefetch buffer 208 to bus master 102, and therefore data is served to the requesting bus master i.e. the bus master 102 without engaging memory bus 112. Note here that upon receiving the request for L2, a new prefetch request will simultaneously be issued for line L3, which is located sequentially after line L2 in the memory. This would be used by the bus master when/if it comes back with a request for L3. Observe here that the latency of servicing data for new requests from a bus master is drastically reduced using this process. Memory bus 112 in the mean while may be used to serve other requests, and thus the overall speed of the system is increased.

In a preferred embodiment of the present invention, bus master prefetch unit 203 provides a programmable feature where one or more bus masters may be enabled for prefetching. Further, Bus master prefetch unit 203 is configured for identifying if a requesting bus master is enabled for prefetching. This is achieved by providing a user programmable feature enabled by programming a register that is understood by the system. The user can selectively enable prefetch for one or more bus masters on bus 116. Bus master prefetch unit 203 continuously reads the user programmed register and uses this register to determine which of the bus masters is/are enabled for prefetching.

There are two ways in which the selective prefetch can be enabled. In the first case, every bus master's request for data from the external memory is accompanied by a 'master identity' (MID). This MID is used by the prefetch unit to identify which master is presently requesting data. The prefetch unit compares this information against the register that is programmed by the firmware, which indicates the particular master/masters for which the prefetch is enabled. This information is compared with the MID from the master request by the prefetch unit to determine if the prefetch unit should respond to the particular bus master's request.

The second method involves an 'address based' prefetch recognition. In this method, the prefetch unit 203 looks at the address of the data, requested by the bus master. This is compared against the registers that the firmware programs. These registers indicate the bounds of addresses (lower bound and upper bound) within which prefetch needs to be performed. If the present address being requested by the bus master is within the bounds, the prefetch unit will issue a prefetch request for the next line after the current request from bus master.

The following example illustrates a bus master with prefetch enabled based on the first option mentioned above. Consider, for example, that bus master 102 is enabled for prefetching, whereas bus master 104 is not enabled for prefetching. In that case, if bus master 102 makes a request for accessing a particular line in the memory device, prefetch request issue unit 204 generates a request for accessing the next address line in memory device 110. On the other hand, if bus master 104 makes a request for accessing a particular line in the memory device, the request is queued in arbitration unit 202 and no prefetch request is triggered. In such cases, prefetching will take place only if the request for accessing memory device 110 is from a bus master that is enabled for prefetching. It will be apparent to one skilled in the art that the second method of selective prefetch may be executed in a similar manner as the method described herein.

The above feature wherein a particular bus master is enabled for prefetch and another is not enabled is particularly useful in cases where one bus master has a very high bandwidth requirement compared to the other bus masters. In such cases it is preferable that a bus master that has a higher bandwidth requirement is served data at a much faster rate than the other bus masters. For example, if there is an AHB bus master like the IDE bus master, which requires data at a high transfer rate, and an audio playback driver which requires a lesser transfer rate bus, the user may enable the IDE bus master over the low bandwidth audio playback driver bus master.

The above-mentioned feature of selective prefetch enable for a bus master is particularly useful in cases where prefetch requests are aborted frequently (also referred to as prefetch request thrashing). For example, consider the case when bus master 102 sends a request for accessing a particular line of data L1 in memory device 110. Prefetch request issue unit 204 generates a prefetch request for line of data L2. Line L2 being next in address to line L1. Before the prefetch request is served, bus master 104 sends a request for accessing another line, for example, line L5 in the memory device. Due to this request, the previous prefetch request for line L2 gets prematurely aborted and prefetch request issue unit 204 generates a new prefetch request for line L6, the line next in address to line L5 in the memory device. This may cause frequent change of prefetch requests, and hence, relevant data is not fetched. Now consider a case when bus master 102 is enabled for prefetching and bus master 104 is disabled for prefetching. In this case, the request generated by prefetch request issue unit 204 for line L2 is not aborted when a request from bus master 104 is received. Therefore, the requests generated by prefetch request issue unit 204 are not aborted frequently and consequently relevant data is prefetched in prefetch buffer 208.

The prefetch-enabled bus masters are also useful when data in prefetch buffer 208 gets overwritten very frequently (also referred to as prefetch buffer thrashing). For example, consider a case when bus master 102 sends a request for accessing a particular line, L1, in the memory device. Prefetch request issue unit 204 generates a request for accessing line L2 in the memory device. This request is served and data corresponding to line L2 is stored in prefetch buffer 203. Subsequently, if bus master 104 sends a request for accessing line L5 in memory device 110, prefetch request issue unit 204 generates a new request for line L6. When this request gets served, previous data in prefetch buffer 203 corresponding to data in line L2 is replaced with data corresponding to line L6. This adds an overhead to memory bus 112 and results in a lot of wasted transfers from the memory device 110. Now consider the case when bus master 102 is enabled for prefetching and bus master 104 is disabled for prefetching. In this case, the data stored in prefetch buffer 203 corresponding to line L2 is riot overwritten. Therefore, the data stored in prefetch buffer 203 is not overwritten frequently and consequently relevant data is served to bus master 102.

In another embodiment, the bus master prefetch unit 203 is also provided with a programmable switch that enables a selective prefetch abort mechanism. When this feature is enabled, a prefetch request is aborted and is replaced only when a bus master, which is enabled for prefetching, sends a request when the current prefetch is in progress. If this feature is not enabled, a prefetch request may be aborted if a bus master, which is not enabled for prefetching, sends a request for accessing memory device 110. This feature, again, prevents the problems of frequent change of prefetch requests, redundant prefetching and underutilization of the memory device bus.

Figure 3:
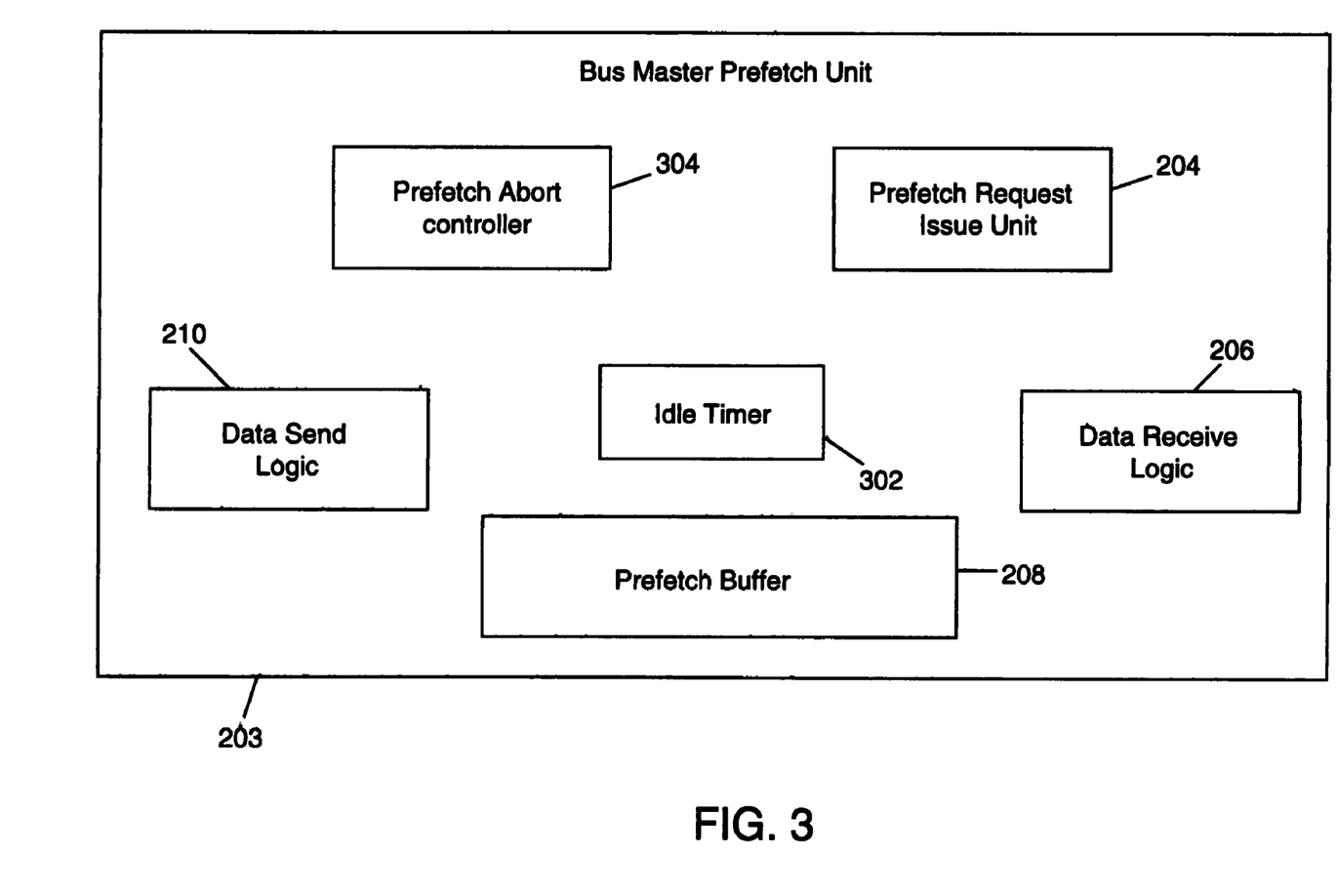
FIG. 3 is a block diagram representing the bus master prefetch unit.

FIG. 3 is a block diagram representing the bus master prefetch unit 203. In another embodiment, bus master prefetch unit 203 is provided with an idle timer 302. Idle timer 302 is capable of measuring idle time of memory bus 112. Idle time of the memory bus is the time for which memory bus 112 is out of use i.e. the time when the memory bus is not used for serving any requests. When a prefetch request, along with other requests from bus masters, is queued in arbitration unit 202, the bus master requests are given preference over prefetch requests. When the last bus master request is served, idle timer 302 starts to measure the memory bus idle time. Bus master prefetch unit 203 waits until idle timer 302 indicates that the idle time has exceeded a threshold idle time. This threshold idle time is programmable by the user. The user can specify the number of cycles the bus master prefetch unit 203 has to wait before it retrieves data from the memory device 110 through the memory bus 112. Based on specific application requirements that are running on the system, the user can program an optimal number of cycles that the bus master prefetch unit 203 has to wait before issuing a prefetch request. The prefetch request is served only after the idle time of memory bus 112 has exceeded the threshold idle time. If a bus master sends a request before the threshold idle time has lapsed, the bus master request is served prior to the prefetch request and idle timer 302 is reset. Bus master requests may be delayed if the idle timer feature is not enabled. For example, consider a prefetch request being served as soon as memory bus 112 is idle. Suppose bus master 102 makes a request for accessing line L1 of data in memory device 110. Prefetch request issue unit 204 generates a request for accessing line L2 of data. As soon as memory bus 112 is found idle, the prefetch request for line L2 begins to get served. In this case, if a request from bus master 104 comes up just after the prefetch request begins to get served, then bus master 104 has to wait until the prefetch request is fully served. This leads to delay in serving of actual requests from bus masters. This disadvantage is overcome using the idle timer feature.

In another embodiment of the present invention, prefetch buffer 208 is capable of storing multiple lines of data. When a request from bus master 102 is received, prefetch request issue unit 204 also generates a request for an address, including two lines after the current address that is requested by bus master 102. If the bus master requested line of data is stored in the prefetch buffer 208, it may be served to bus master 102 simultaneously with prefetching of data in the next in address line of memory device 110.

For example, consider the case when bus master 102 requests line L1 in memory device 110. In response, the prefetch request issue unit 204 generates a request for both L2 and L3 in that order, line L2 being next in address to line L1 and line L3 being next in address to line L2. Suppose prefetch requests for line L2 and L3 have been served and data corresponding to both these lines is stored in the prefetch buffer 208. Now, when the bus master requests data corresponding to line L2, data send unit 210 can send data corresponding to line L2 to bus master 102 simultaneously with the data receive unit 206 fetching data corresponding to line L4 from memory device 110. Line L4 being next in address to line L3. The data corresponding to line L4 is stored in the second line of the buffer in the prefetch buffer 208. Prefetch buffer 208 now has two lines of data corresponding to addresses L3 and L4.

Although the above discussion takes into consideration only one or two lines of buffer in prefetch buffer 208, it will be apparent to one skilled in the art that prefetch request issue unit 204 may generate more than two requests for sequential lines of data and prefetch buffer 208 is capable of storing more than two lines of data.

Bus master prefetch unit 203 is also provided with a prefetch abort controller 304. Prefetch abort controller 304 determines if a request received from bus master 102 is the last request for the programmed transfer. Prefetch abort controller 304 compares the address to which the prefetch needs to be issued against the address range to which the DMA bus master, i.e. bus master 102 is programmed to receive data. When a user programs the DMA controller to transfer a chunk of data, the start and end addresses are noted by the DMA controller. The register corresponding to the end addresses of the requested data is seen by the prefetch abort controller 304. Now, whenever a new prefetch request is to be serviced by bus master prefetch unit 203, it compares the prefetch address with the end address of the DMA request. If the prefetch address is greater than the end address that bus master 102 is supposed to transfer, prefetch abort controller 304 prevents bus master prefetch unit from generating any new prefetch request to memory bus 112.

The manner of execution of the system described above has been described in conjunction with FIGS. 4A and 4B.

Figure 4A:
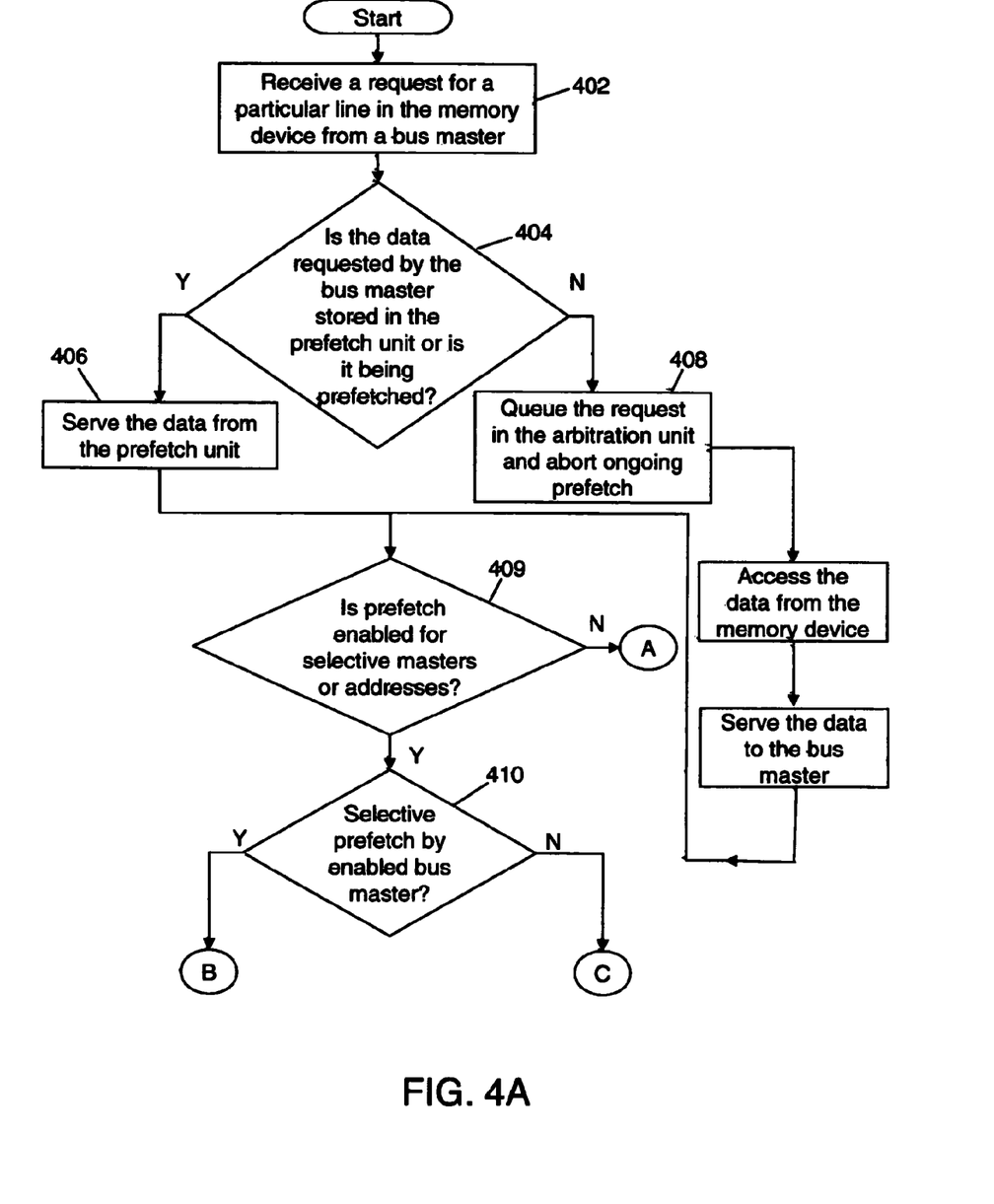
FIGS. 4A and 4B are a flowchart representing the method for generation of a prefetch request.
Figure 4B:
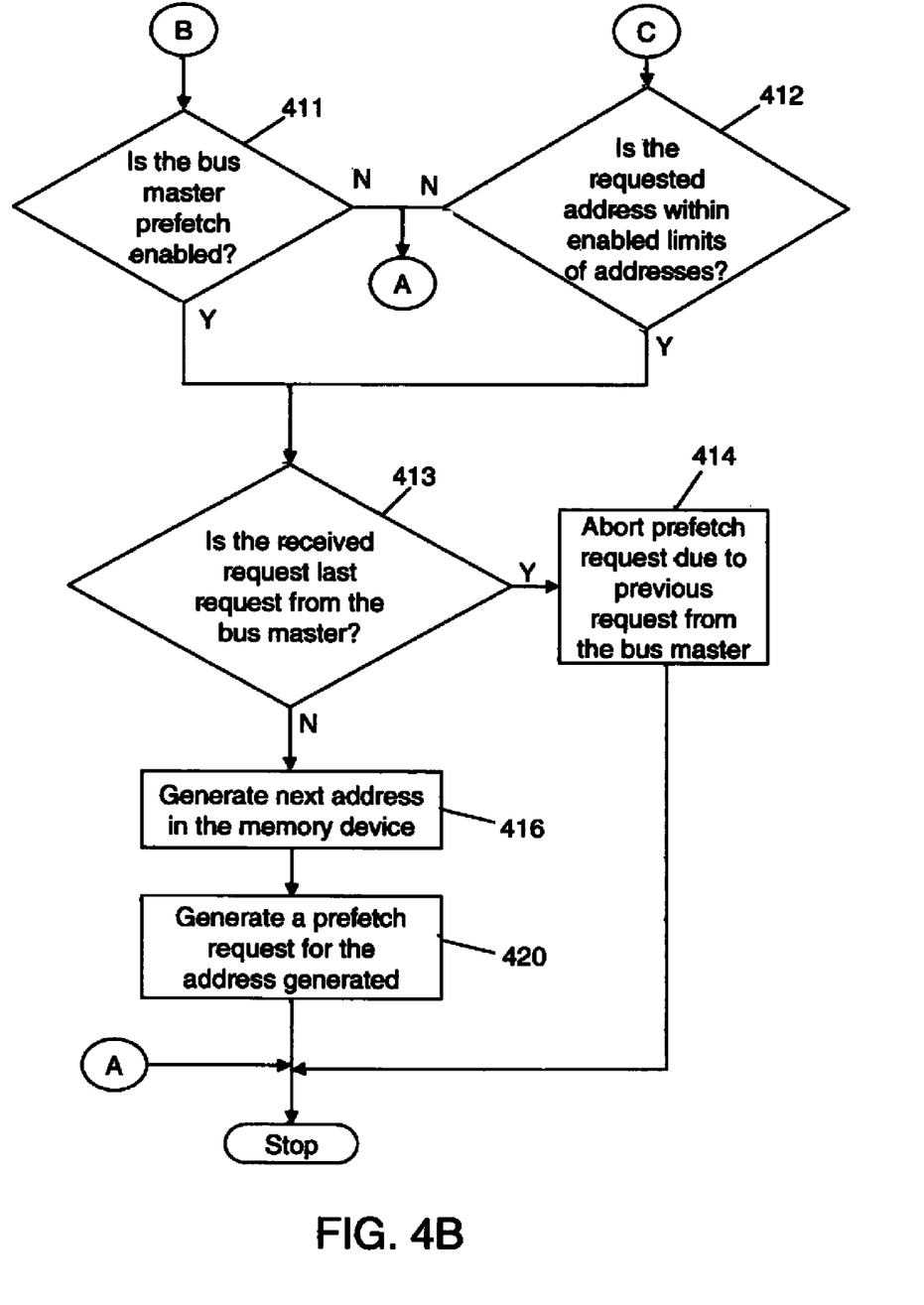

FIGS. 4A and 4B are a flowchart representing the method for generation of a prefetch request. The steps performed during the operation of the preferred embodiment discussed above are illustrated in the flowchart.

At step 402, bus master 102 makes a request to memory controller 114 for accessing a particular address of line in memory device 110. The request is received by bus master prefetch unit 203. Thereafter at step 404, bus master prefetch unit 203 checks if the data requested by bus master 102 is stored in prefetch buffer 208 or if the data is being prefetched. If the data requested by bus master 102 is stored in prefetch buffer 208 or if the data is being prefetched, then step 406 is executed, otherwise step 408 is executed. At step 406, the data stored in prefetch buffer 208 is served to bus master 102. At step 408, the request by bus master 102 is queued in arbitration unit 202 and ongoing prefetch request is aborted. This request may be served according to the predefined rules of arbitration in arbitration unit 202. Subsequent to steps 406 or 408, whichever is executed, step 409 is executed. At step 409, the bus master prefetch unit 203 checks if it is programmed for selective bus master or selective address limit prefetch. If it is programmed for selective prefetch, step 410 is executed. At step 410, bus master prefetch unit 203 checks if it is programmed to prefetch for selective bus masters or for selective address limit for the requested data. If the bus master prefetch device is programmed for selective bus master prefetching then step 411 is executed, otherwise step 412 is executed. At step 411, bus master prefetch unit 203 checks if the requesting bus master, i.e. bus master 102, is enabled for prefetching or not. If the bus master is enabled for prefetching, then step 413 is executed. Similarly, at step 412, bus master prefetch unit 203 checks if the address of the requested data falls within the limits of addresses in memory device 110, which have been enabled for prefetching. If the requested data falls within the address limits, then step 413 is executed. At step 413, the prefetch abort controller identifies if the request received is the last request from bus master 102. If the request is the last request from bus master 102 then step 414 is executed. At step 414, prefetch request generated due to previous request from bus master 102 is aborted. If at step 413, the request is not the last request from the bus master, then step 416 is executed. At step 416, the prefetch request issue unit generates the address of the line of data next to the requested line of data in the memory device. Subsequently, at step 420, the prefetch request issue unit generates a request for accessing the addresses earlier generated in step 416.

FIG. 5 is a timing diagram comparing serving of data from prefetch buffer 208 and serving of data directly from memory device 110. FIG. 5A represents clock cycles that are generated in the system. FIG. 5B represents the timing of generation of a request from bus master 102 to access the memory device. The request is assumed to be for a line of data. FIG. 5C represents timing of serving of the line of data stored in prefetch buffer 208 to the bus master. FIG. 5D represents timing of engagement of memory bus 112 when the requested data is being served through memory bus 112.

Figure 5A:
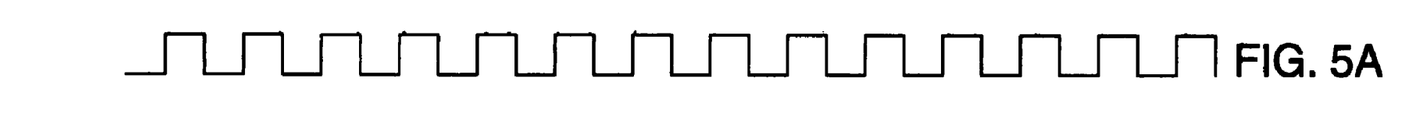
FIGS. 5A, 5B, 5C, and 5D are timing diagrams comparing serving of data from a prefetch buffer and serving of data directly from a memory device.
Figure 5B:
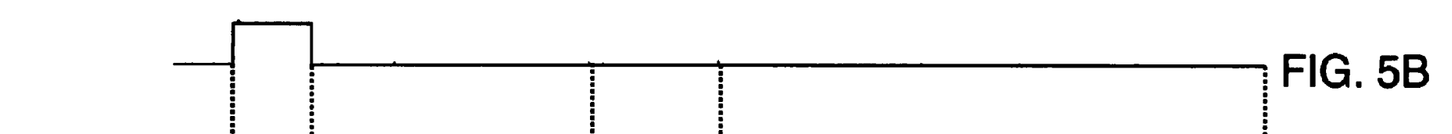
Figure 5C:
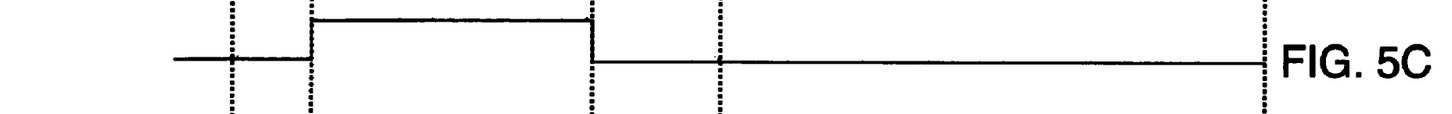
Figure 5D:
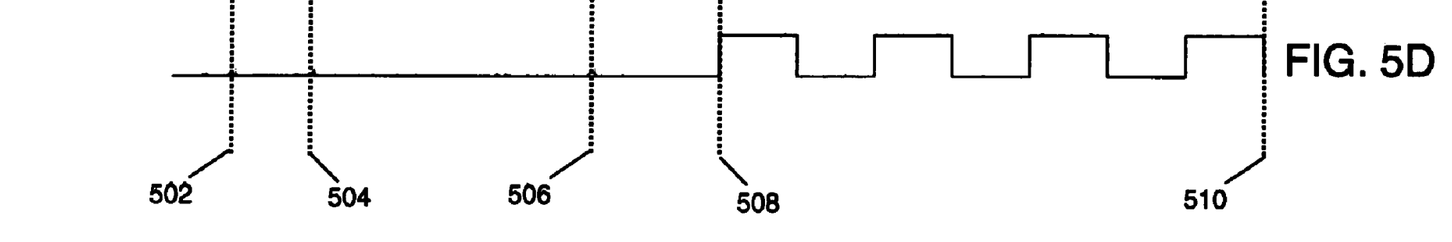

An illustrative example has been discussed in order to compare serving of prefetched data from prefetch buffer 208 and serving of data directly from memory device 110. Bus master 102 generates a request for accessing a particular line of data in memory device 110. This request is sent to memory controller 114 between time instant 502 and time instant 504. The high in FIG. 5B between time instant 502 and time instant 504 represents the delivery of a request from bus master 102. If the requested data is stored in the prefetch buffer, then without the delay of a single clock cycle, data send logic 210 sends the data to the bus master. The high between time instant 504 and 506 in FIG. 5C represents the serving of data to the bus master. This data is served by data send logic 210. The data is being served to the bus master without any latency in four consecutive clock cycles. If the data requested by bus master 102 is not stored in the prefetch buffer, then the request from the bus master is queued in arbitration unit 202 at time instant 504. This request waits for arbitration before it gets served. This request has to wait for a period between time instant 504 and 508. At time instant 508, this request begins to get served. The memory device may be, for example, a 16 bit external SDRAM memory. FIG. 5D represents engagement of memory bus 112. The highs represent the memory bus being engaged and lows represent the memory bus being unused. The transfer of data from the memory device to the bus master continues until time instant 510. Here, the memory device is assumed to be half-word wide. Hence it takes two cycles for every word to be serviced to the requester from the memory device.

Figure 6A:
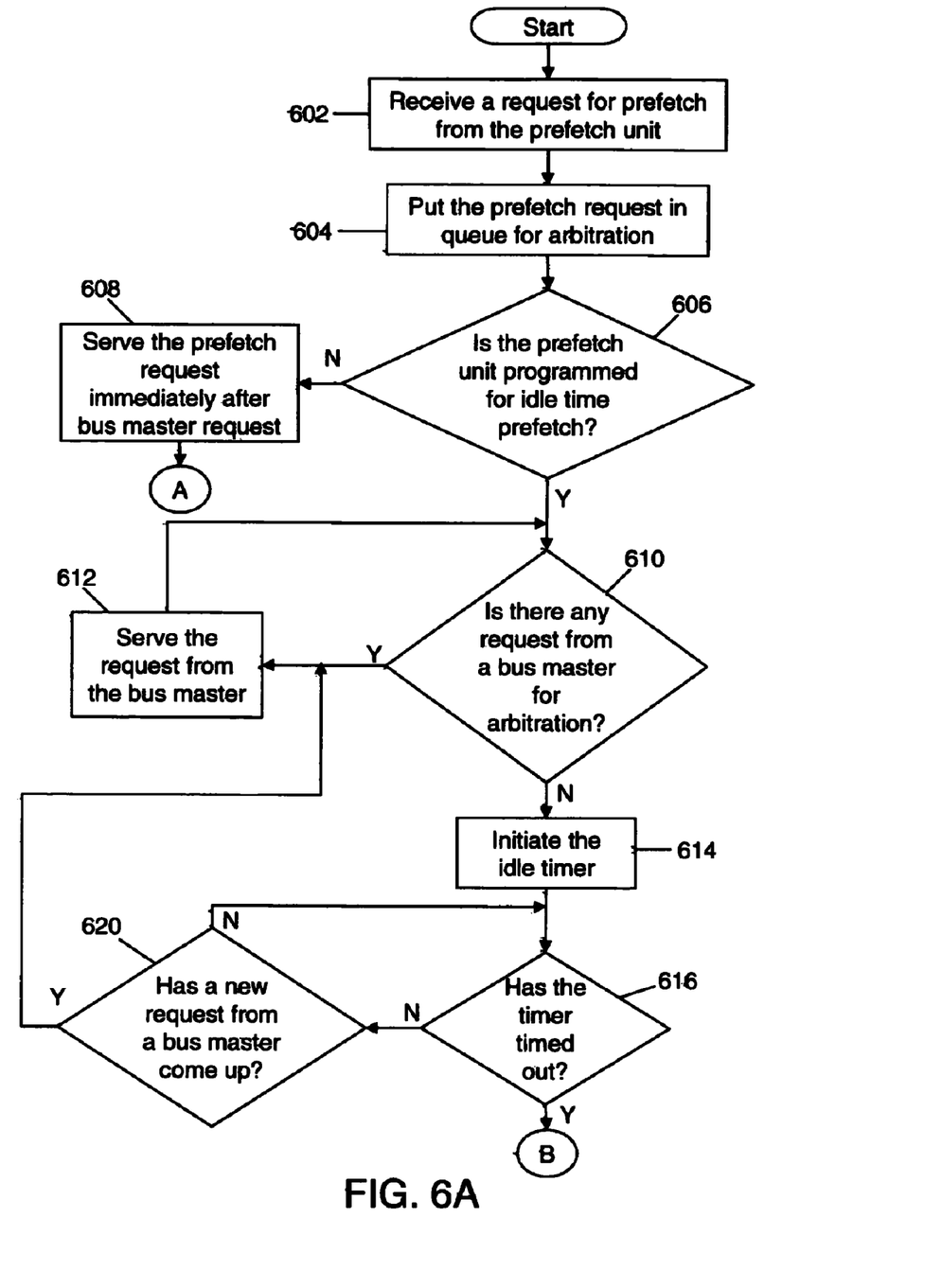
FIG. 6 is a flowchart representing the method of serving a prefetch request in the case of a bus idle time prefetch.
Figure 6B:
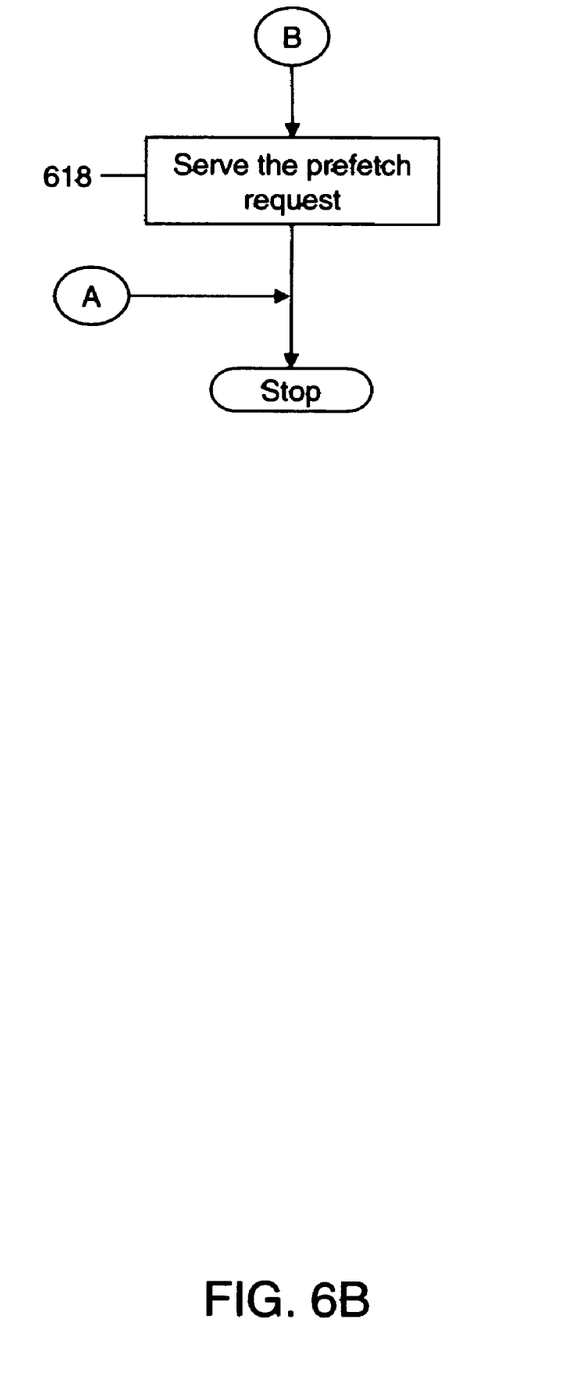

FIGS. 6A and 6B are a flowchart representing the method of serving a prefetch request in the vase when the bus idle time prefetch feature is used/operational. The steps involved in serving prefetched data are described in the sequence in which they are performed.

At step 602, a prefetch request is generated by prefetch request issue unit 204 and the request is received by arbitration unit 202. Thereafter, at step 604, the prefetch request is queued for arbitration in arbitration unit 202 along with the requests from other requesters. Thereafter, at step 606, bus master prefetch unit 203 checks if it is programmed to prefetch only after the idle timer has timed out or to prefetch immediately after the requested data has been served to the requesting bus master in response to the request from bus master 102. If bus master prefetch unit 203 is programmed to prefetch immediately after serving the requested data according to the bus master request, step 608 is executed. If it is programmed for idle time, step 610 is executed. At step 608, the prefetch request is served immediately after the bus master request. At step 610, the arbitration unit checks if there are any requests from bus masters 102, 104, 106, and 108. If there are requests from the bus masters, then at step 612 the arbitration unit allows one of the requesting bus masters to access the memory device 110. Step 610 is repeated subsequent to step 612. At step 610, if there are no requests from bus masters queued in the arbitration unit, step 614 is executed. At step 614, idle timer 302 is initiated. Subsequently, at step 616, the idle timer identities if the threshold idle time has lapsed. If the threshold idle time has lapsed, then at step 618, the prefetch request is served. Referring back to step 616, if the threshold idle time has not lapsed, step 620 is executed. At step 620 arbitration unit 202 checks if any new request has been received from a bus master during the idle time of the bus. If there is a new request, then step 612 is executed. If there is no new request, then step 616 is executed.

The disclosed system and method have several advantages, some of which are cited hereinafter.

An advantage of the disclosed system is that it performs effective prefetching of data. The system prefetches the next in address line of data when a particular line of data in the memory device is requested. The DMA bus masters are always programmed to transfer large chunks of sequential data in bursts. Therefore, when a bus master requests a particular line of data in the memory device, it is almost always true that the bus master would subsequently require accessing the next in address line of data.

The prefetch mechanism has the following advantages over prior art cache mechanisms for memory bus bandwidth optimization:

1. The prefetch mechanism of the present invention predicts data which is likely to be used in the future. Requests for the predicted data are made in sequentially increasing order of addresses. The prior art cache mechanism, however, fetches data 'wrapped around' the actually requested address. 'Wrapped around' data includes addresses both before and after the address of the actually requested address. This wrapped around data may or may not be in sequentially increasing order.

2. The prefetch mechanism of the present invention can be configured to generate a low priority request for accessing the predicted data. The prior art cache mechanism, however, does not generate any such low priority request. This is because most of the cache mechanisms are "requester performance centric" and are not designed for "effective" utilization of the external memory bus.

3. In the case of the prefetch mechanism of the present invention, a prefetch "hit" condition (which is the condition when the data required by the requester is present in the prefetch unit) would still generate a new prefetch request to the external memory bus. This request is generated to fetch new data that the bus master is expected to request for in its next request. In contrast, in the case of the prior art cache mechanism, if the data for the requested address results in a cache "hit" (which implies that the data is present in the cache), the system does not request any further data that the requester may require in the future.

4. In the case of the prefetch mechanism of the present invention, the prefetch controller and the prefetch buffer may be in the memory controller. This configuration of the prefetch unit being embedded in the memory controller helps the prefetch controller work in a tightly coupled fashion with the memory controller. This helps the prefetch controller and the memory controller work together to utilize the external memory bus efficiently whenever the bus is determined to be idle. Hence, the memory bus bandwidth is better utilized. On the other hand, a prior art system employing a cache mechanism does not have the cache incorporated within the memory controller. Moreover, the cache does not generate a low priority request to the memory controller and therefore may use up memory bus bandwidth to fetch un-needed data, eventually not required by any requester.

Furthermore, the prefetch mechanism of the present invention may be used in conjunction with a cache mechanism. This would further improve the performance of the system by reducing memory access latencies. This is because, although the Cache may not request any additional data, the prefetch unit can fetch the next line of data and store it in the prefetch buffer. Whenever the Cache comes back with a new request, the prefetch buffer can return this data from its buffer, which speeds up the data fetch time for the Cache. The prefetching of a next line of data also is in line with the concept of spatial locality that the Cache uses to fetch additional data other than the one being requested by the Cache's master/requester. The cache mechanism is essentially used to speed up requests for a requester. The prefetch mechanism of the present invention is used to optimize bandwidth utilization of the memory bus. Therefore, if the prefetch mechanism of the present invention is used in conjunction with the cache mechanism, both speeding up of requests and optimization of memory bus bandwidth is achieved.

The present invention employs an optimal size buffer. The buffer size is small enough not to burden an integrated circuit chip on which the invention is preferably implemented, from an area perspective. Therefore, the cost of implementing such a system is not very high. Simultaneously, the buffer size is big enough to make sure that the system performs effectively. The buffer size is usually chosen to be equal to the maximum request size that can be issued by any bus master. This is to ensure that whenever a bus master generates a new request, all data required to serve this request is present in the prefetch buffer. This data can be served immediately to the bus master without any additional latency.

Another advantage of the present invention is that it can be programmed to serve a prefetch request immediately after a request for memory access has been made that causes the prefetch request. Since the two requests are essentially for data stores in addresses next to each other, the data row in the memory device does not have to open and dose to access the prefetch request. Therefore the overall speed of memory access is increased.

An added advantage of the present invention is that the specific bus master for which prefetch can be enabled can be changed dynamically by the user. This allows the user to enhance an application depending on the specific requirements of the application at that particular instant. For example, if at a time instant it is crucial for the application to read data from the memory device and serve it to the display driver bus master at a high rate, then the user can program the bus master prefetch unit to enable prefetch for the display driver bus master or also to disable the prefetch for other bus masters. If at a later instant it is required by the application to read data from the memory and store it in the IDE disk at a high bandwidth, then the display driver bus master prefetch can be disabled and prefetch can be enabled for the IDE bus master. This flexibility allows the user to enhance the overall system performance.

Another added advantage of the system of the present invention is that it provides an idle timer for prefetch. This idle timer lets the user inform the system about the threshold time that the system needs to consider before the memory controller can consider the memory device bus to be idle.

The system, as described in the present invention or any of its components, may be embodied in the form of a computer system. Typical examples of a computer system includes a general-purpose computer, a programmed microprocessor, a micro-controller, a consumer electronics device, a mobile electronics equipment or device, a peripheral integrated circuit element, and other devices or arrangements of devices that are capable of implementing the steps that constitute the method of the present invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these'embodiments only. Numerous modifications, changes, variations, substitutions and equivalents will be apparent to those skilled in the art without departing from the spirit and scope of the invention as described in the claims.

What is claimed is:

1. A bus master prefetch unit for optimizing memory bus bandwidth, the bus master prefetch unit comprising:
   means for receiving a request from a bus master of a plurality of bus masters for accessing a particular line of data in a memory device through a memory bus;
   means for verifying if the received request is for data stored in the bus master prefetch unit;
   means for generating at least one prefetch request for accessing at least one line of data in the memory device, the at least one line of data being next to the line of data for which the received request is received from the bus master;
   means for arbitrating between said request from the bus master and said at least one prefetch request;
   means for obtaining data from the memory device, the data corresponding to the prefetch request; and
   a prefetch buffer for storing the obtained data as stored data, wherein the stored data is operable to be served to the bus master when the bus master requests the stored data.

2. The bus master prefetch unit as recited in claim 1 wherein said at least one prefetch request is a request for one or more lines of data with sequentially increasing addresses.

3. The bus master prefetch unit as recited in claim 1 further comprising:
   means for making a prefetch request for a next line of data following a line of data stored in the prefetch buffer when the line of data requested by the bus master is stored in the prefetch buffer.

4. The bus master prefetch unit as recited in claim 1 wherein said bus master prefetch unit is embedded in a memory controller.

5. The bus master prefetch unit as recited in claim 1 further comprising means for coupling the bus master prefetch unit to a memory controller.

6. The bus master prefetch unit as recited in claim 1 further comprising means for determining if the memory bus is idle.

7. The bus master prefetch unit as recited in claim 1 further comprising means for supplying data to the bus master.

8. The bus master prefetch unit as recited in claim 1 further comprising means for determining if a requesting bus master is enabled for prefetching.

9. The bus master prefetch unit as recited in claim 1 further comprising means for determining if an address of the particular line of data lies in a predefined set of addresses.

10. The bus master prefetch unit as recited in claim 1 further comprising means for aborting the at least one prefetch request.

11. The bus master prefetch unit as recited in claim 1 further comprising means for identifying whether a request from a bus master for accessing the memory device is the last request from the bus master.

12. The bus master prefetch unit as recited in claim 1, wherein the prefetch buffer is capable of storing multiple lines of data.

13. The bus master prefetch unit as recited in claim 1 further comprising an idle timer for measuring idle time of the memory bus, wherein the means for generating request generates a request when the idle timer indicates that the idle time of the memory bus is equal to a predefined threshold idle time.

14. A system for accessing a memory device, the system comprising:
- a plurality of bus masters, wherein at least one bus master is enabled for prefetching;
- a memory device;
- a memory bus; and
- a memory controller connected to the memory device through the memory bus, the memory controller comprising:
  - means for receiving a request from a bus master for accessing a particular line of data in the memory device through the memory bus;
  - means for verifying if the requesting bus master is enabled for prefetching;
  - means for verifying if the address of the particular line of data lies in a predefined set of addresses;
  - means for verifying if the received request is for data stored in the memory controller;
  - means for generating a prefetch request for accessing a line of data in the memory device, the line of data being next in address to the line of data for which the request from the bus master is received;
  - means for arbitrating between a plurality of requests from said plurality of bus masters and said prefetch request generated by the memory controller;
  - means for fetching data from the memory device; and
  - means for storing the prefetched data, wherein the stored data is operable to be served to a bus master when the bus master requests the stored data.

15. The system as recited in claim 14, wherein the memory controller further comprises means for supplying data to the bus master.

16. The system as recited in claim 14, wherein the memory controller further comprises means for aborting the prefetch request.

17. The system as recited in claim 14, wherein the memory controller further comprises means for identifying whether a request from a bus master for accessing the memory device is the last request from the bus master.

18. The system as recited in claim 14, wherein the means for storing is capable of storing multiple lines of data.

19. The system as recited in claim 14, wherein the memory controller further comprises an idle timer for measuring idle time of the memory bus, wherein the means for generating a prefetch request generates a request when the idle timer indicates that the idle time of the memory bus is equal to a predefined threshold idle time.

20. A method for optimization of memory bus bandwidth, comprising:
- receiving a first request for accessing a particular line of data in a memory device, the first request being made by a first bus master of a plurality of bus masters;
- generating a prefetch request for prefetching the data in a next address line of data following the particular line of data in the memory device;
- arbitrating between the prefetch request and a second request made by one of said plurality of bus masters;
- prefetching data corresponding to the next address line of data in the memory device into a memory controller;
- storing the prefetched data in the memory controller; and
- serving the prefetched data to said first bus master if the first bus master requests the prefetched data, the request being received by the memory controller.

21. The method as recited in claim 20, wherein the step of generating a request for prefetching comprises:
- identifying if the first bus master is enabled for prefetching; and
- generating the prefetch request only if the first bus master is enabled for prefetching.

22. The method as recited in claim 20 further comprising:
- aborting the prefetch request if a second bus master of said plurality of bus masters, which is enabled for prefetching, requests access to the memory device.

23. The method as recited in claim 20 further comprising:
- aborting the prefetch request if the first request is identified to be the last request from the first bus master.

24. The method as recited in claim 20 further comprising:
- measuring the idle time of the memory bus; and
- prefetching data only if the memory bus is idle for a predefined threshold idle time.

25. The method as recited in claim 20, wherein said serving is performed simultaneously with said prefetching data from the memory device.

26. The method as recited in claim 20, wherein said arbitrating is based on a priority associated with each bus master and the amount of data requested.

* * * * *